US009398460B1

(12) United States Patent
Randall

(10) Patent No.: US 9,398,460 B1
(45) Date of Patent: Jul. 19, 2016

(54) MOBILE PHONE-BASED SYSTEM FOR ON-DEMAND SECURITY PRIMARILY VIA NON-VOICE COMMUNICATION

(71) Applicant: Trevor B Randall, Edmond, OK (US)

(72) Inventor: Trevor B Randall, Edmond, OK (US)

( * ) Notice: Subject to any disclaimer, the term of this patent is extended or adjusted under 35 U.S.C. 154(b) by 0 days.

(21) Appl. No.: 14/724,415

(22) Filed: May 28, 2015

(51) Int. Cl.
*H04W 12/06* (2009.01)
*H04L 29/08* (2006.01)
*H04W 4/22* (2009.01)
*H04W 4/02* (2009.01)
*H04M 3/51* (2006.01)
*H04W 4/12* (2009.01)
*H04W 4/08* (2009.01)

(52) U.S. Cl.
CPC ............ *H04W 12/06* (2013.01); *H04L 67/306* (2013.01); *H04W 4/02* (2013.01); *H04W 4/22* (2013.01); *H04M 3/5116* (2013.01); *H04W 4/08* (2013.01); *H04W 4/12* (2013.01)

(58) Field of Classification Search
CPC ...... H04L 67/306; H04W 12/06; H04W 4/02; H04W 4/22; H04W 4/08; H04W 4/12; H04M 3/5116
See application file for complete search history.

(56) References Cited

U.S. PATENT DOCUMENTS

| 8,923,805 B2* | 12/2014 | Single | H04W 4/22 455/404.1 |
| 2005/0075116 A1* | 4/2005 | Laird | A61B 5/04 455/456.3 |
| 2005/0239477 A1* | 10/2005 | Kim | H04W 76/007 455/456.1 |
| 2014/0335897 A1* | 11/2014 | Clem | G08G 1/0112 455/456.3 |
| 2016/0006870 A1* | 1/2016 | Merjanian | H04M 3/5116 379/45 |
| 2016/0027290 A1* | 1/2016 | English | H04N 5/23203 340/539.13 |

* cited by examiner

*Primary Examiner* — Barry Taylor
(74) *Attorney, Agent, or Firm* — Edward L. White

(57) ABSTRACT

A mobile phone-based system for providing on-demand security to a requester primarily via non-voice communication, the system comprising a database having requester, security escort, engagement, and review data, and request factors; a requester phone having one non-voice and voice communication channel and an interface facilitating engagements; a screening facility qualifying security escorts, requesters, and reviewing one screened person's qualifications; a security escort phone having one non-voice and voice communication channel, an interface facilitating engagements; an engagement engine having a query generator facilitating requests and generating an appropriate queries and a response generator receiving the queries and generating factor-based responses; and a meeting engine facilitating all phases of the engagement, whereby the security escorts required for a particular engagement are determined based on requester-provided data as a function of a requester requirements, security escort provider abilities, and application of request factors.

64 Claims, 11 Drawing Sheets

MOBILE PHONE-BASED SYSTEM FOR ON-DEMAND SECURITY PRIMARILY VIA NON-VOICE COMMUNICATION

CROSS-REFERENCE TO RELATED APPLICATIONS

None.

FIELD OF THE INVENTION

The present invention generally relates to on-demand security services via non-voice communication. In particular, the invention relates to a system and method for requesting a security escort for a specific time, location, and duration rendezvousing with the escort at the predetermined location and time, authenticating both the requester's and security escort's identity, executing the engagement as requested and terminating the engagement thereby allowing an individual to request and receive a security escort for a single engagement.

BACKGROUND

Most security services are divided into remote monitoring and surveillance, onsite security, and escort services such as Brinks® and Wells Fargo®. Remote monitoring and surveillance consists of having a security alarm and video surveillance in a residential, commercial, and industrial setting wherein a security specialist monitors the video and alarms from a remote location for possible intrusions and may respond to the intrusions by sending armed security or the local law enforcement to the location. On-site security entails a security specialist being located on-site and possibly patrolling the area and protecting the location. Escorts usually provide physical protection at the desired location for highly valuable cargo such as precious stones, metals, currency and for high profile persons such movie stars, pro-athletes, government officials, etc. Onsite security and escort services require a significant monetary investment and time commitment and is not realistically useful for an average person. Additionally, the above described security services do not address the need for security at a single engagement, for example, a person late at night in a high crime area might need an escort to their home or vehicle. This is but one example, there are many example where the ability to have an on-demand escort would be desirable such as the next example.

Recently, there have been several incidents of real estate agents being killed during home showings, and these killings are likely the result of the opportunity created by the agents working alone. This scenario may have been prevented with an on-demand reputable security escort service wherein the agent could have done an on-demand request for a requirement for a security escort for the duration of the showing. The shortcomings of the above described services include cost, long term commitment, lack of customization, and no effective way to meet an individual's needs.

SUMMARY OF THE INVENTION

The present invention overcomes these shortcomings by providing a system and method for on-demand security escorts via non-voice communication for as little as a single engagement to a single requester to provide security protection for an event without exorbitant costs and commitment. The system allows a requester using a mobile phone to request a security escort for a predetermined time, place and duration, a system server to receive the request then to contact available security escorts meeting the request factors in the local vicinity through their mobile phones, the escorts may then reply if available and accept engagement. Upon accepting the engagement the security escort meets the requester at a rendezvous point wherein the escort service is performed. The service is preferably paid via an online funds transfer. Additionally, the present invention takes into account specific security escort criteria such as number of security escorts required, training, armed, and uniformed to develop an expected cost.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE INVENTION

Figure 1:
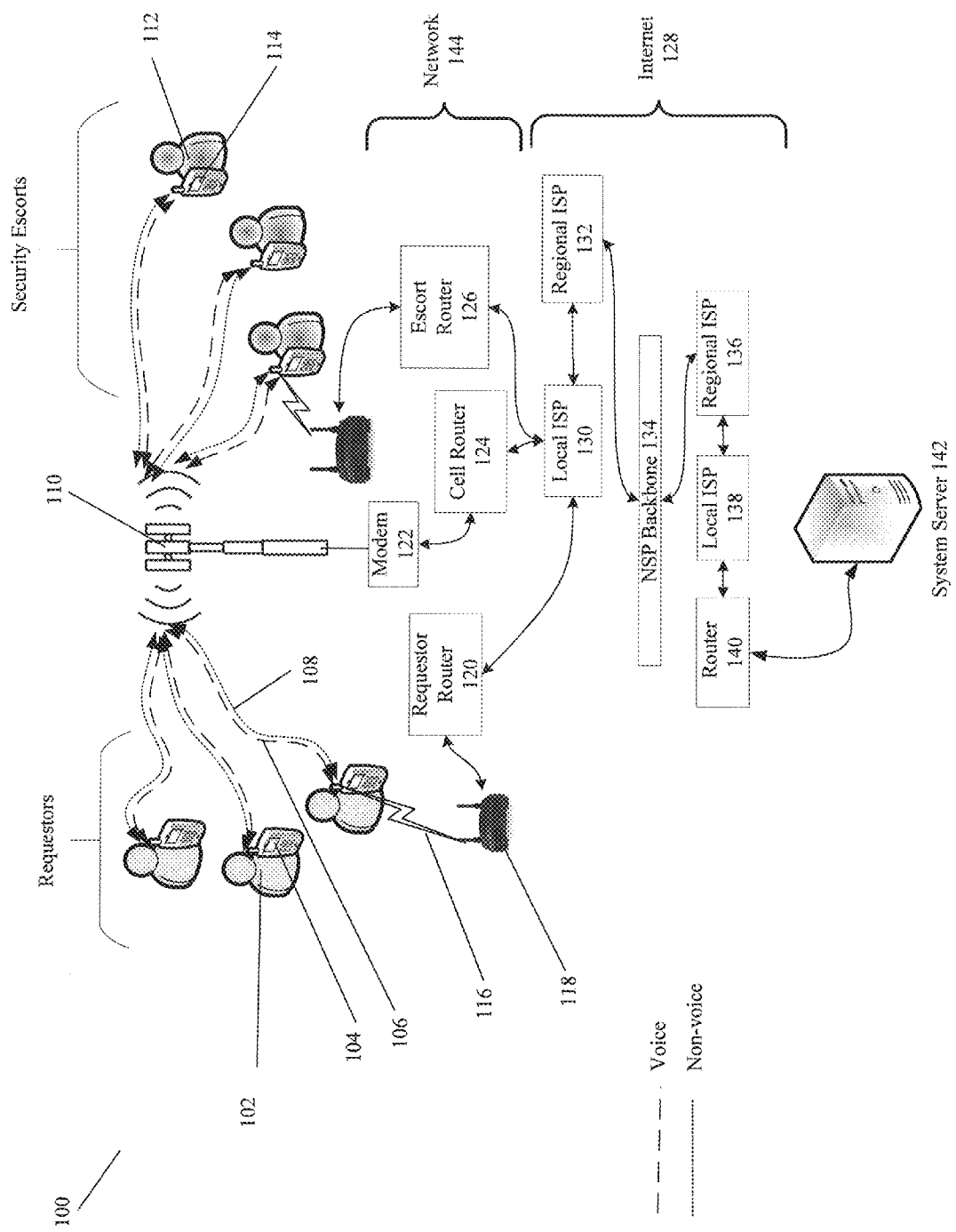
FIG. 1 is a diagrammatic representation of one embodiment of the on-demand security escort system using a networked mobile telephone system.

FIG. 1 is a diagrammatic representation of one embodiment of a system 100 according to the present invention. This embodiment may include a requester 102, a requester mobile phone 104, a non-voice communication path 108, a voice communication path 106, a cellular tower 110, a security escort 112, a security escort's mobile phone 114, a network system 144, the internet 128, and a system server 142. Other embodiments may include wired, wireless, and hybrid networks and other internet 128 implementations.

The on-demand security system 100 allows a requester 102 through a mobile phone 104 and a mobile phone application (i.e. interface) to request a security escort 112 for a specific engagement 318 by selecting engagement data 304 and additional request factors 308 as desired by the requester 102. The request for security escorts 800 process will be further discussed in FIG. 8. In the preferred embodiment, this request is sent via the non-voice communication path 108 through the cellular telephone network to a cellular tower 110 where the request is routed to a network 144 connecting the cellular tower 110 to the input to the internet 128. The request is then routed through the internet 128 to the system server 142 where the system server 142 compares the request with availability of the security escorts 112. Additionally, the system server 142 may poll the security escorts 112 for their acceptance of the proposed engagement. Once a suitable match or matches has been determined, the requester 102 may be notified and allowed to select and purchase the services using the requester mobile phone 104. Once the security escort 112 services are purchased, an engagement confirmation 824 is sent and the identification information for both the requester 102 and the security escort 112 is exchanged to facilitate the engagement 318. The requester 102 and the security escort 112 rendezvous 830 at the engagement location 320 where the security escort 112 performs the service. After completion of the engagement 318, both parties may notify the system 100 of the completion of the engagement 318. Once this notification occurs and the engagement 318 is terminated, the security escort 112 may be placed back into the system 100 as available.

The security escort 112 communicates in a similar fashion with the system 100 as the requester 102. The security escort 112 through a security escort mobile phone 114 and preferably a mobile phone application preferably provides the system server 100 with their current and expected availability. The system may poll an escort even if they do not show as available to give the escort the chance to consider a potential engagement. When the system identifies specific security escorts 112 for an engagement 318, the system server 142 communicates with the security escorts 112 through the internet 128, the network 144, cellular tower 110, and security escort mobile phone 114 using the non-voice communication path 108. The matching escorts are polled for their availability based on the engagement data 304. The security escort 112 may respond to the system server 142 as available. Once the requester 102 selects a security escort 112, the security escort 112 is notified. This communication provides the engagement data 304 and the requester 102 identification data to the security escort 112. Upon arriving at the engagement location 320, the security escort 112 may need to communicate with the requester 102 on a near real-time basis. The requester 102 or the security escort 112 may communicate with the other utilizing the voice communication path 106 or via non-voice communication path 108 (i.e. a text chat).

The network 144 as described in the preferred embodiment may utilize a cellular tower 110, a modem 122, and a cellular router 124 to transmit a request through the internet 128. In this embodiment, the network 144 may transmit data received by the cellular tower 110 to the internet 128 by converting the cellular signals received by the cellular tower 110 to data wherein a modem 122 can transmit the data to a cellular router 124 that directs the data through the internet 128 via a local internet service provider 130. This preferred embodiment allows a requester 102 to initiate a request on the requester's mobile phone 104 and submit the request via cellular network or the internet 128. It would be obvious to one skilled in the art to use other technology to covert the incoming cellular signals and condition the signal so as to make it compatible with the network 144 and the internet 128.

The internet 128 follows the current system configuration consisting of local internet service providers (ISP) 130,138, regional ISPs 132, 136 and a network service provider (NSP) backbone 134. A request enters through a local ISP 130 on the sender's side of the internet 128 and is routed through the regional ISP 132 to the NSP backbone 134. The request then exits the NSP backbone on the system server's 142 side and is routed through the server's regional ISP 136 to the server's local ISP 138 and to the system server router 140 and the request ending at the system server 142. The system server 142 utilizes this bidirectional pathway when communicating with the requester 102 and the security escort 112. It would be obvious to one skilled in the art to use other technology to effectuate the internet 128 communication between the requester 102, security escort 112, and the system server 142. The foregoing paths are intended to illustrate communication paths not to limit the paths that the communication could take.

Another embodiment allows the requester's mobile phone 104 and security escort's mobile phone 114 to connect to the internet 128 via Wi-Fi 116 and a wireless access point 118. A requester router 120 for the requester 102 routs the request to the internet 128. A security escort router 126 for the security escort 112 routs the response to the internet 128. Another embodiment may use a hybrid of cellular towers 110 and Wi-Fi 116. The embodiment with WI-FI 116 may be preferable to a requester 102 or security escort 112 in a large city with tall buildings that tend to block, disrupt and degrade cellular signals. This embodiment provides an alternate route for communication and allows the requester and security escort mobile phones 104, 114 to automatically select the best mode of communication.

Figure 2:
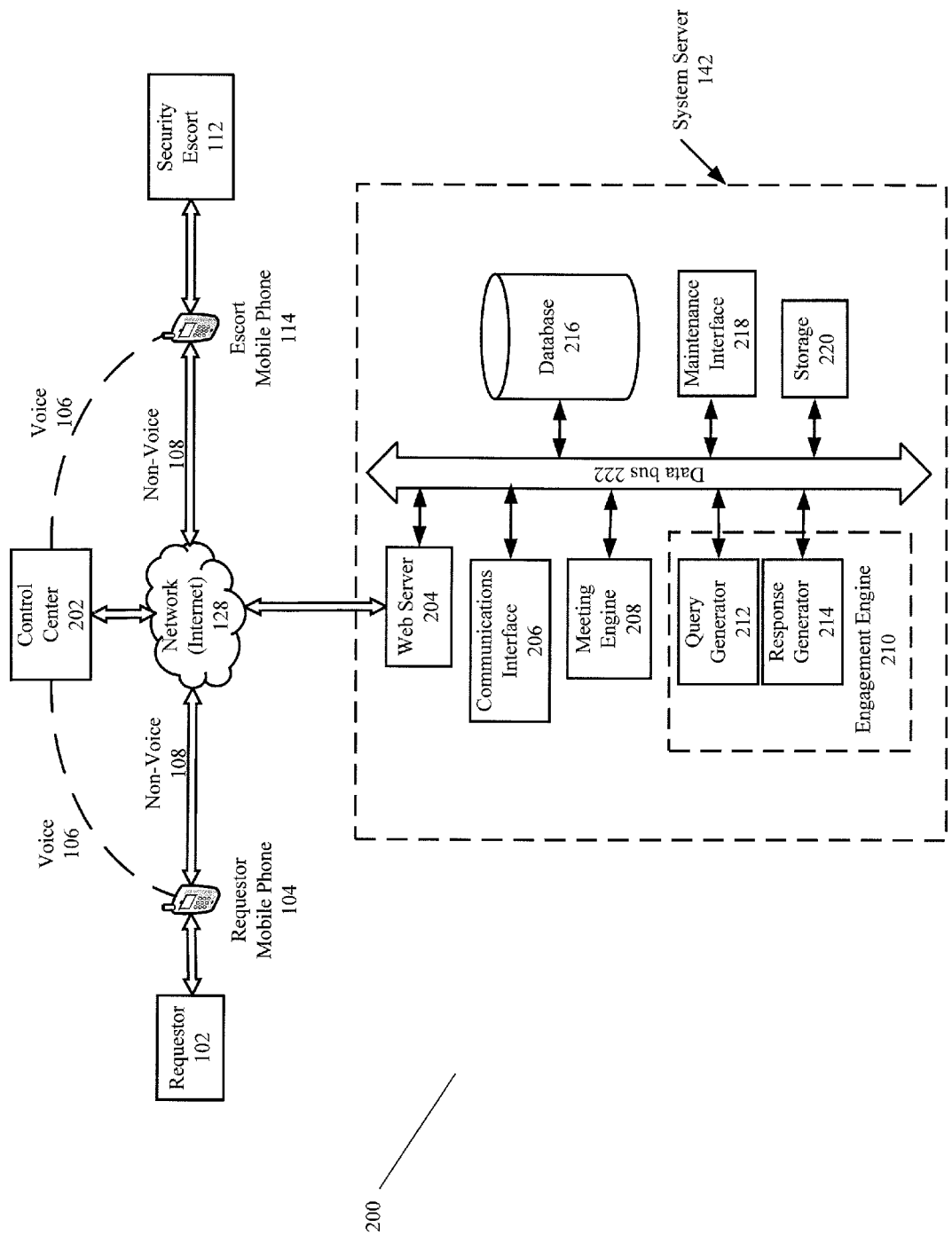
FIG. 2 illustrates an engagement between a single requester and a single security escort.

FIG. 2 illustrates a system operation 200 for an engagement 318 between a single requester 102 and a single security escort 112 and a system server 142. The system operation 200 components for a single engagement 318 may include but are not limited to a requester 102, a requester mobile phone 104, a security escort 112, a security escort mobile phone 114, voice communication 106, non-voice communication 108, a control center 202, the internet 128 and a system server 142. A requester 102 may make a non-voice communications 108 request for a security escort 112 using a mobile phone application on the requester mobile phone 104 wherein the application connects to the system server 142 and transmits the request with the engagement data 304 and request factors 308 to the system server 142. In another embodiment, the application may use a graphical user interface allowing the information to be directly entered into the system server 142. A non-preferred embodiment would allow a requester to access the system using a web browser by logging into the system. The system server 142 polls the available security escorts to determine if they are available for the proposed engagement and willing to accept the engagement. The system server 142 then generates an availability response to the requester 102. Once the requester 102 selects and pays for the escort service, the systems server 142 provides the security escort 102 with the engagement data 304. Additionally, the system server 142 sends identification and authentication information 826, 828 to both the requester 102 and the security escort 112 to facilitate the engagement 318. The requester 102 and the security escort 112 rendezvous at the engagement location 320 where the escort service is performed. After the engagement 318 termination, the requester 102 and security escort 112 may provide review for the engagement 318. Additionally, the security escort 112 may provide their availability status to the control center 202 and the system server 142 via security escort mobile phone 114.

A basic mobile phone typically has the following features: voice and non-voice communications, a user interface with the most common input mechanism a keyboard, a display, a camera, and some basic programs known as applications. However, the basic phone may lack the ability to install applications selected by the user. However a "smartphone" has the features noted above in the basic mobile phone but the input mechanism may be a touch screen. Additionally, a smartphone may have the ability to access the internet via a cellular network or Wi-Fi, download and execute user applications, send and receive data, send and receive pictures and videos, Bluetooth®, and Global Positioning System (GPS) receiver. Bluetooth® is a wireless technology for exchanging data or short distances. The GPS receiver enables a user to know their precise position on the earth and share their position with others by sending the data using some application. GPS will be described hereinafter in greater detail.

The requester mobile phone 104 has at least one voice and non-voice channels for which to communicate over the radio frequency spectrum. One skilled in the art would be aware of which frequency bands are currently available for the voice and non-voice communication. Also it is preferable that the requester mobile phone 104 may automatically determine its location using GPS, other methods described below or methods known to one skilled in the art. Additionally, the requester mobile phone 104 may have a mobile phone application to facilitate the request by a requester 102 for a security escort 112. The phone application may be installed via a computer connection or may be installed wirelessly. The requester mobile phone 104 through the mobile phone application may receive a response from the meeting engine 208 and display the response enabling a requester 102 to meet and identify the security escort 112. Also, the requester mobile phone 104 may enable the requester 102 to terminate the services of the escort 112 and close the engagement 318. At any time during the use of the mobile phone application the requester 102 may declare an emergency using the requester mobile phone 104. When declaring an emergency, the GPS location of the requester 102 is automatically transmitted to the first responders and the control center 202. Additionally, the requester 102 may covertly declare an emergency by entering a distress code, by pressing a button or series of buttons on the screen or otherwise. Upon declaring an emergency, the requester 102 will automatically be connected to the first responders such as police via 911. Additionally, the control center 202 may be conferenced into the call and may be able to monitor and provide assistance. In addition to voice communication and location data, the distress code may initiate a camera on the requester's phone. The requester 102 may use the requester mobile phone 104 to pay for the security escort 112 which will be described below in FIG. 8.

The control center 202 may house the system server 142 and provide voice and non-voice communications for both the requester 102 and the security escort 112. The control center 202 may allow the requester 102 and security escort 112 to talk or text directly without revealing their mobile phone numbers to the other in order to maintain their privacy. Additionally, the control center 202 may perform the functions of a security escort screening facility wherein an analytical algorithm may be used to qualify requesters 102 and a security escorts 112. Another function of the screening facility may be to approve a requester 102 and security escort 112 whose data has been flagged based on a certain specified criteria. For example, this specified criterion could include criminal convictions wherein certain crimes may be waived for employment as a security escort 112. The screening facility may block a requester 102 and a security escort 112 from requesting service and providing service, respectively. The screening facility may also review a screened person's qualifications, possibly on a periodic basis to verify that the information and qualifications are up to date and to remove non-active requesters 102 and non-qualified security escorts 112 from the system server 142 as required.

The security escort mobile phone 114 has at least one voice and non-voice channels for which to communicate over the radio frequency spectrum. As seen above with the requester mobile phone 104, it is preferable that the security escort mobile phone 114 automatically determine its location using GPS, other methods described below or methods known to one skilled in the art. Additionally, the security escort mobile phone 114 may have mobile phone application to facilitate the reception of the proposed request by a requester 102 and display the proposed request. The security escort 102 through the security escort mobile phone 114 may respond to the proposed engagement 318 through the meeting engine 208. After accepting the engagement 318, the security escort mobile phone 114 may display the information necessary to meet, identify, and authenticate a requester 102. Also, the security escort mobile phone 114 may enable the security escort 112 to close the engagement 318. At any time during the use of the application, the security escort 112 may declare an emergency using the security escort mobile phone 114 wherein the GPS location of the security escort 112 is automatically transmitted to the first responders and the control center 202. Additionally, the security escort 112 may covertly declare an emergency by the same type of mechanism discussed above for the requester. Upon declaring an emergency, the security escort 112 will automatically be connected to the first responders such as police via 911. Additionally, the control center 202 may be conferenced into the call and may be able to monitor and provide assistance.

The system server 142 may consist of a web server 204, a data bus 222, a communications interface 206, an meeting engine 208, a database 216, an engagement engine 210 which can be further delineated into a query generator 212 and a response generator 214, a storage device 220, and a maintenance interface 218. Each of these components will be described in further detail below. However, the delineation of these components does not indicate that the objectives of the system could not be accomplished in other ways. For example, a data bus 222 is expected to be used, but it is not an element of the claims, and thus its function could be accomplished by another configuration of hardware or software components, as an example.

The web server 204 provides bidirectional communication to the internet 128. The web server 204 is the interface between the internet 128 and the system server 142, which communicates with the rest of the components in the system server 142 via a data bus 222. The web server 204 is the interface between the mobile phone application and the system server 142. Additionally, the web server 204 may host a system website allowing a requester 102 to make a request through an internet interface in addition to a mobile phone application in order to deliver web content to the requester 102 which can be accessed through the internet 128. This web server 204 controls the requester's 102 access, the security escort's 112 access, the flow of information to and from the requester 102 and security escort 112. The web server 204 allows a requester 102 and a security escort 112 to create accounts through the requester account creation process 400 and the security escort account creation process 500 described hereinafter in further detail.

The data bus 222 provides the data pathway between all the components within the system server 142. The communications interface 206 in conjunction with the data bus 222 control the inward information flow coming from the web server 204 in the form of requests that need to be acted upon by the meeting engine 208 to the outward information flow as created by the engagement engine 210 and its associated components the query generator 212 and the response generator 214. Additionally, the communications interface 206 controls the information flow to and from a database 216, a storage device 220, and a maintenance interface 218.

The meeting engine 208 interactively facilitates a meeting between the requester 102 and a security escort 112. The meeting engine 208 receives the requester's 102 inputs entered by a requester 102 via the requester mobile phone 104. The interactive process may prompt a requester 102 to provide engagement data 304 and to provide additional request factors 308 so that the data provided most accurately reflects requirements related to an engagement 318. Additionally, the meeting engine 208 accepts the availability and profile information entered by a security escorts 112 via the security escorts' mobile phone 114. The interactive process may prompt security escorts 112 to provide security escort profile and history data 302 and availability status that most accurately reflect their current state. The system then generates a database record based on a request with all its associated engagement data 304 such as the engagement 318, location 320, duration 322 and date and time 324, and it's associated request factors 308 such as number of escorts 330, training 332, armed 334, uniformed 336, gender 338, and transportation 340. The requester 102 may automatically enter this information into the meeting engine 208 by the requester mobile phone 104 or a saved profile on the system server 142. After the engagement 318 is accepted by the requester 102 and security escort 112, the meeting engine 208 transmits verification of the engagement 318 and the engagement data 304 including engagement location 320, identification information, and authentication information to the requester 102 and security escort 112. Upon completion and notification, the meeting engine 208 will close the engagement 318.

An engagement location 320 may be entered into the meeting engine 208 manually through the requester mobile phone 104 as described above. However, if the requester's mobile phone 104 has an automatic positioning capability and it is active, the requester 102 may submit the location 320 using the automated positioning capability. The mobile phone application may ask the requester 102 if it is acceptable to allow the use of the requester's 102 current location thereby making the current location and the engagement location 320 synonymous. The automatic positioning capability can come in one of many forms; multilateration, triangulation, global positioning, WI-FI, or a hybrid system incorporating two or more of the foregoing technologies.

Multilateration and triangulation are ground-based methods by which a requester's 102 location is determined by series of radio towers communicating with the mobile device, using the time difference of arrival (TDOA) or angle of arrival (AoA) measurements respectively, to determine a requester's 102 location.

Global positioning uses a satellite navigation system known as Globalnaya navigatsionnaya sputnikovaya sistema or GLObal NAvigation Satellite System (GLONASS) operated by the Russian Aerospace Defense Forces systems spaced-based or the Navigation Satellite Timing and Ranging System (NAVSTAR) Global Positioning System (GPS) operated by the United States. Both systems use satellites to provide location and time information in all weather conditions, anywhere on or near the Earth where there is an unobstructed line of sight to four or more satellites.

Wi-Fi-based positioning system uses a database of Wi-Fi access points where the location is determined by the signal strength between the mobile device and the known locations of these access points in the database. Based on this information, the location can be determined by combining this data and locating a common intersection point. The more access points the greater the accuracy of the location of the requester 102. This system is particularly useful in urban areas with high-rise buildings preventing the line of sight needed for GPS and the requester 102 being indoors.

The hybrid positioning system uses a combination of the above positioning systems described to supplement the other systems to create a location solution. For example, one hybrid mode may be the "Assisted GPS" mode where the device may only have access to three satellites and the other system provides the remaining piece of location information in order to determine the requester's 102 current location 320. If the requester 102 decides not to allow the automatic positioning system to be utilized, then the requester 102 must enter the location 320 manually.

The database 216 stores all requester profiles and history records 300, security escort profiles and history records 302, engagement data records 304, review data records 306 and request factors records 308. The database is preferably comprised of a set of tables including a requester profiles and history data 300 table, a security escort profiles and history data 302 table, an engagement data table 304, a review data 306 table, and a request factors data 308 table. Each table is described in further detail below. Generally, once a requester 102 makes a request with respect to an engagement, data 304 and request factors 308 are added to the database via requester's mobile device 104, each table accepts its piece of data entered by the requester 102 and is stored within each table and associated with a single record. This configuration allows all the associated data to be retrieved by a requester 102 based on a query.

The engagement engine 210 generates a proposed engagement 318 based on the requester's 102 requests to the query generator 212 regarding an engagement 318 and selecting the desired request factors 308 for the engagement 318. Once the availability of security escorts 112 is determined, the meeting engine 208 displays the results to the requester 102 including the expected cost of the engagement 318. However, if there is no available security escorts 112, the system 100 will notify the requester 102 and automatically suggest an engagement 318 that may be acceptable based on some portion of the engagement data 304, known availability of the security escorts 112, and request factors 308. The system removes filters established by the engagement data 304 and request factors 308 to open up the opportunities for a match. To accomplish this task, the engagement engine 210 uses a query generator 212 and response generator 214.

The query generator 212 interactively facilitates the requester 102 engagement 318 requests and generates requester 102 based queries. The query generator 212 accepts the requester's 102 input via the requester mobile phone 104 application and processes the request using an algorithm to find records that most closely correspond to the requester's 102 entered information with the greatest emphasis placed upon the engagement data 304. Query settings may be adjusted based on the requester's 102 preferences. Request factors 308 are selectable within the query such as the number of escorts 330 that are needed for the engagement 318, the training 332 required for the specific engagement 318, and whether the security escort 112 needs to be armed 334. The request factors 308 cited are to illustrate types of request factors 308 possible but not limited to the request factors 308 named in FIG. 3. These request factors 308 further refine the query enabling a more pointed engagement 318 as desired by the requester 102. Not selecting these request factors 308 enables a broader engagement 318 selection. Additionally, the requester 102 can create predetermined engagement queries by preselecting the desired criteria and saving the engagement 318 criteria as a "saved engagement" wherein the requester 102 can connect to the system 100 and execute a saved engagement based on one of the requester's 102 saved engagements thereby quickly providing the requester 102 with the desired information. After the query parameters are selected, the requester 102 executes the query that provides the engagement results to the response generator 214.

The response generator 214 receives the records and determines the availability and expected cost of the security escort 112 by analyzing and weighting the request factors 308, review data 306 and prioritizing the records to determine the closest match to the engagement data 304 and the request factors 308. The expected costs may be calculated using the following factors: number of escorts 330, training 332, aimed 334, uniformed 336, gender 338, transportation 340, location 320, duration 322, date and time 324, and immediacy. If response generator 214 determines an exact match to the engagement data 304 and the request factors 308, the response generator 214 replies through the requester mobile phone 104 application that a security escort 112 is available and provides the expected cost of the engagement 318. If the requester 102 desires to use the service, they select the security escort 112 then the application may allow the requester 102 to pay 816 for the security escort 112 using the requester mobile phone 104. Once payment is received, the requester 102 receives the security escort 112 identification information. If no exact match is identified, the system may autosuggest a new date and time to the requester 820 for the engagement 318. If the requester 102 agrees to the new engagement 318 information, then the requester 102 may move to the payment step 816 as described above. Additionally, the system server 142 may identify a request factor or factors 308 that are preventing the engagement 318 and suggest removing the problematic request factor or factors 308 if it is acceptable to the requester 102. If so, then the requester 102 may agree to the new request factors 308, then the requester 102 moves to the payment step 816 described above. A requester 102 may examine the reviews 328 of a security escort 112 before making their selection. Likewise, a security escort 112 may examine the reviews 328 of the requester 102 before responding to a request.

Storage 220 provides a location to store the system server 142 operating system, the web server 204 software including the mobile application interface, the database 216 information including the associated tables and queries for the database 216. The physical configuration may be in the form of a digital or a spinning mass hard drive. Additionally, the cloud may be used as a storage medium for some of the system information. It would apparent to one skilled in the art the optimal physical configuration based on space, funding, and other common factors associated with electronic storage. Though the storage device 220 is shown separate from the database 216 on FIG. 2, it should be understood that the database 216 and other system data may be maintained within the storage device 220. Further, different types of computer storage may be encompassed within the storage device 220. The system may use a hard drive for some types of data storage and chip-based memory for other types of storage.

A system maintenance interface 218 enables system administrators to update, upgrade the system, provide normal system maintenance, and provide administrative functions for the web site and system. One of these features is the ability of the administrator to block identified requesters 102 based on factors including but not limited to failure to pay and failure to show. The maintenance interface 218 also allows the modification and addition of request factors 308 to the database 216.

Figure 3:
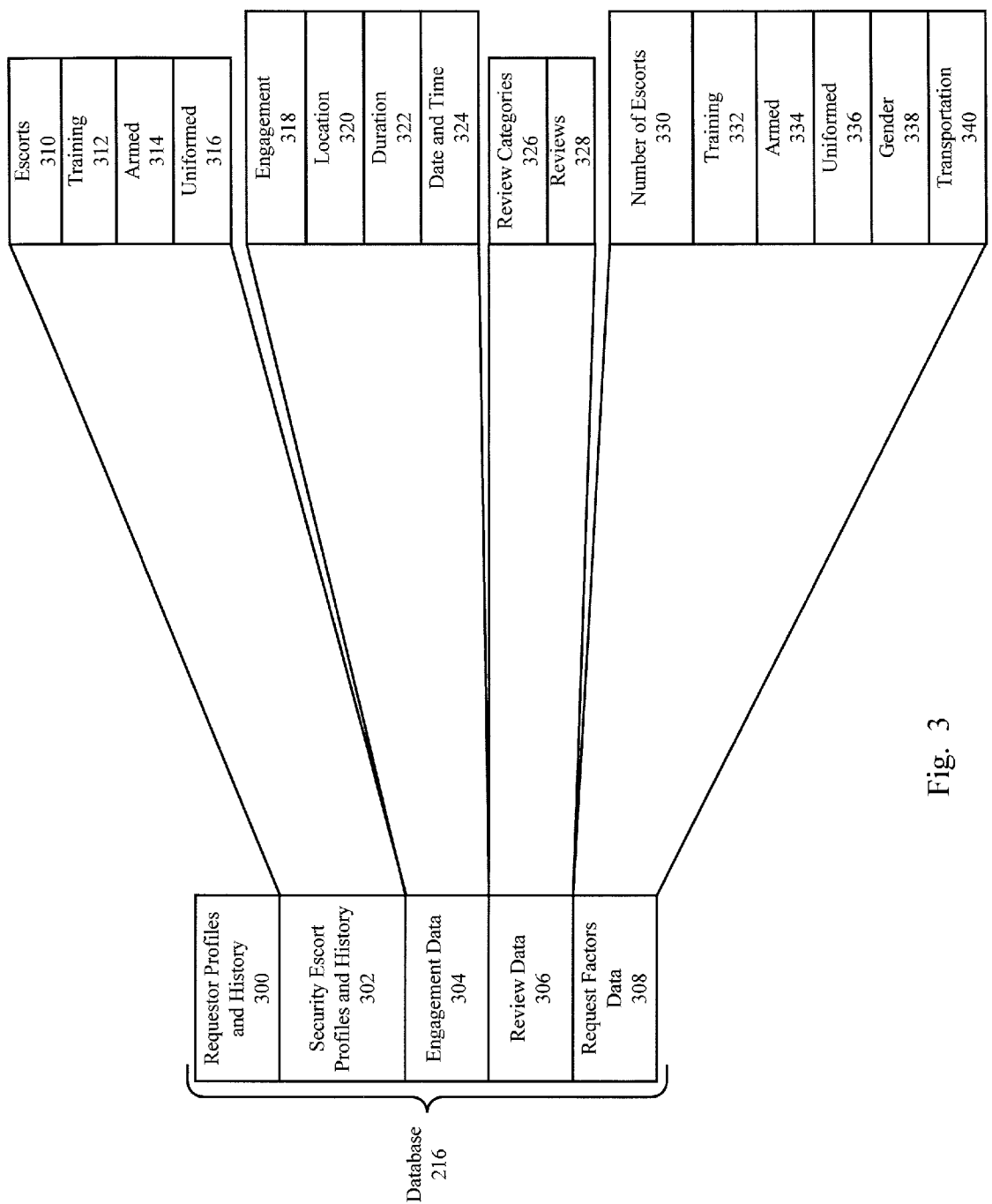
FIG. 3 is a diagram illustrating the contents of a version of a database used in the system.

FIG. 3 illustrates an embodiment of the database 216 and its associated tables. Each time a requester 102 submits engagement data 304 and request factors 308, a unique record is created within the database. The database 216 may be divided into five tables: a requester profile and history table 300, a security escort profile and history table 302, engagement data table 304, review data table 306, and request factors data table 308. The requester profile and history data table 300 is initially populated by the requester 102. The security escort profile and history data table 302 is initially populated by the security escort 112. Both the requester 102 and security escort 112 populate the engagement data table 304, the request factors data table 308 and the review data table 306. Each time a requester 102 adds engagement data 304 and request factors data 308 to the system 100 it is parsed and placed in its element in the appropriate table. Each time a security escort 112 adds engagement data 304 and profile data 302 to the system 100 it is parsed and placed in its element in the appropriate table. The engagement engine 210 retrieves elements of these tables and determines the best match per the requester's 102 request.

The requester profile and history data table 300 stores requester 102 data such as the requester's 102 username, requester's password 406, other required requester 102 data, and optional requester 102 data. Other required requester 102 data may include data such as their name, address, e-mail address, age, payment information but are not limited to this biographical and payment data. The optional data may include a picture, and authentication type information that only a requester 102 would be privy. Additionally, a transitional photograph portraying the current view of the requester 102 at the time of generating a request may be uploaded to the optional data and transmitted to the security escort 112 for quicker recognition during the rendezvous 830. The method by which this data is obtained is further described in FIG. 4 in the requester account creation 400.

The security escort profile and history data table 302 stores security escort 112 data such as the security escort's 112 username, security escort's 112 password 506, other required security escort 112 data, and optional security escort 112 data in escorts 310. Other required security escort 112 data may include data such as their name, address, training 312, uniformed 316, armed 314, firearm qualifications, age, security credentials, but are not limited to this data. The optional data can include a picture, and authentication type information that only a security escort 112 would be privy. Additionally, a transitional photograph portraying the current view of the security escort 112 may be uploaded to the optional data and transmitted to the requester 102 for quicker recognition during the rendezvous 830. The method by which this data is obtained is further described in FIG. 5 in the security escort account creation 500.

The engagement data 304 table may include the engagement 318, the engagement location 320, the engagement duration 322, and the engagement date and time 324 entered by requesters 102 through the mobile phone application and transmitted to the meeting engine 208. The engagement data 304 table may include a set of security escort 112 data for at least one security escort 112 for at least one engagement 318. Additionally, the engagement data 304 table records may include categories of engagements based on at least one of the request factors 308 such as number of escorts 330, escort training 332, armed 334, uniformed 336, gender 338, and transportation 340. Once the request has been received and the appropriate tables populated, the request is processed through the engagement engine 210 and the security escort 112 receive notification of the proposed engagement. The security escort 112 responds and the requester 102 receives notification of the availability of a security escort 112. The engagement data 304 table may be preloaded with security escort 112 data for one security escort 112 related to one engagement category. The engagement data 304 table loaded with expected costs for an engagement 318 based on a specific request factor 308. An expected cost range may be calculated for an engagement category with one request factor 308 and loaded into the engagement data 304 table. The table may be preloaded with expected costs for engagements 318 with multiple request factors 308. The expected cost may include costs associated with the engagement data 304 costs and the additional costs based of the request factors 308 selected.

The review data table 306 may include items such as review categories 326 and reviews 328 but are not limited these items. This data table stores information supplied by the requester 102 and the security escort 112 where both the requester 102 and security escort 112 may rate the engagement 318 between them. The review with respect to a requester 102 may include timeliness, attitude, friendliness, but are not limited to these attributes and the review with respect to a security escort 112 may include timeliness, attitude, friendliness, appearance, competence, but are not limited to these attributes. From the reviews 328, ratings for a requester 102 may be created and used to determine if the requestor 102 should be blocked from using the service. Additionally, ratings from the reviews 328 for security escorts 112 may be created and used to determine if a security escort 112 meets the level of desired customer service.

The engagement data 304 table may include the engagement 318, the engagement location 320, the engagement duration 322, and the engagement date and time 324 entered by requesters 102 through the mobile phone application and transmitted to the meeting engine 208. Once the request has been received and the appropriate tables populated, the request is processed through the engagement engine 210, the security escort 112 receives notification of the proposed engagement. If a security escort 112 accepts engagement then the requester 102 receives notification of the availability of a security escort 112.

The request factors 308 data table stores the request factors 308 that may be used in conjunction with the engagement data 304 to determine the availability of a security escort 112. The request factors 308 data table is preferably a combination of requester 102 and the security escort 112 inputs used to create the table. These request factors 308 include number of escorts 330, training 332, armed 334, uniformed 336, gender 338, transportation 340 but are not limited to these factors. One skilled in the art may select other factors as desired or appropriate for security service.

Figure 4:
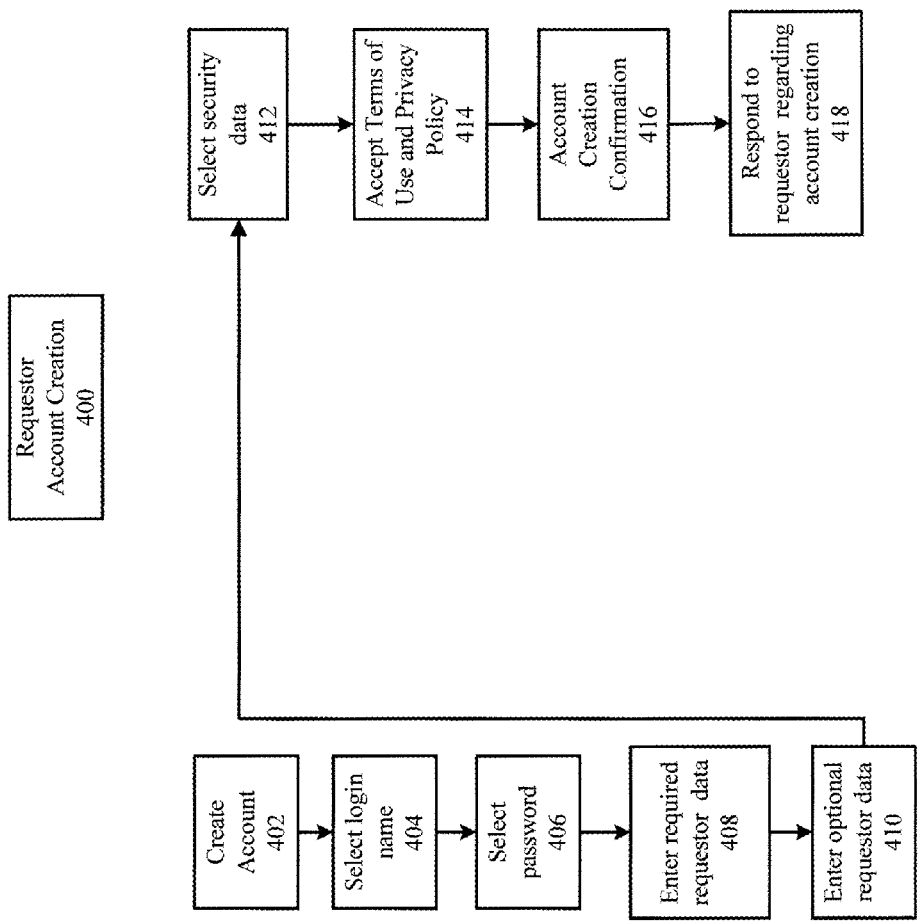
FIG. 4 is a process flow diagram illustrating one method for creating a requester account.

FIG. 4 illustrates a method for requester account creation 400 by which a requester 102 may create an account 402 on the system 100 and gain access to the functions of the system 100. A requester 102 may select the requester account creation process 400 to initiate the account creation through the requester's mobile phone 104. An account can also be established at an internet page maintained as a part of the system. The requester 102 will select login name 404 and create its associated password 406. Additionally, the requester 102 may provide the required requester data 408 which preferably includes at least the first name, the last name, and mobile phone number. The requester 102 may add other optional requester data 410 to their account, such as a profile image, billing information, and an email address. The requester 102 may provide security data 412 in order to protect their 102 account and to verify that the requester 102 is who they claim to be when they log into the system. Finally the requester 102 must accept the terms of use and the privacy policy 414 before receiving the account creation confirmation 416. After account creation, the system 100 will respond to the requester 102 regarding the account creation 418. After the requester 102 receives a notification from the system 100, they may initiate an engagement 318 request.

Figure 5:
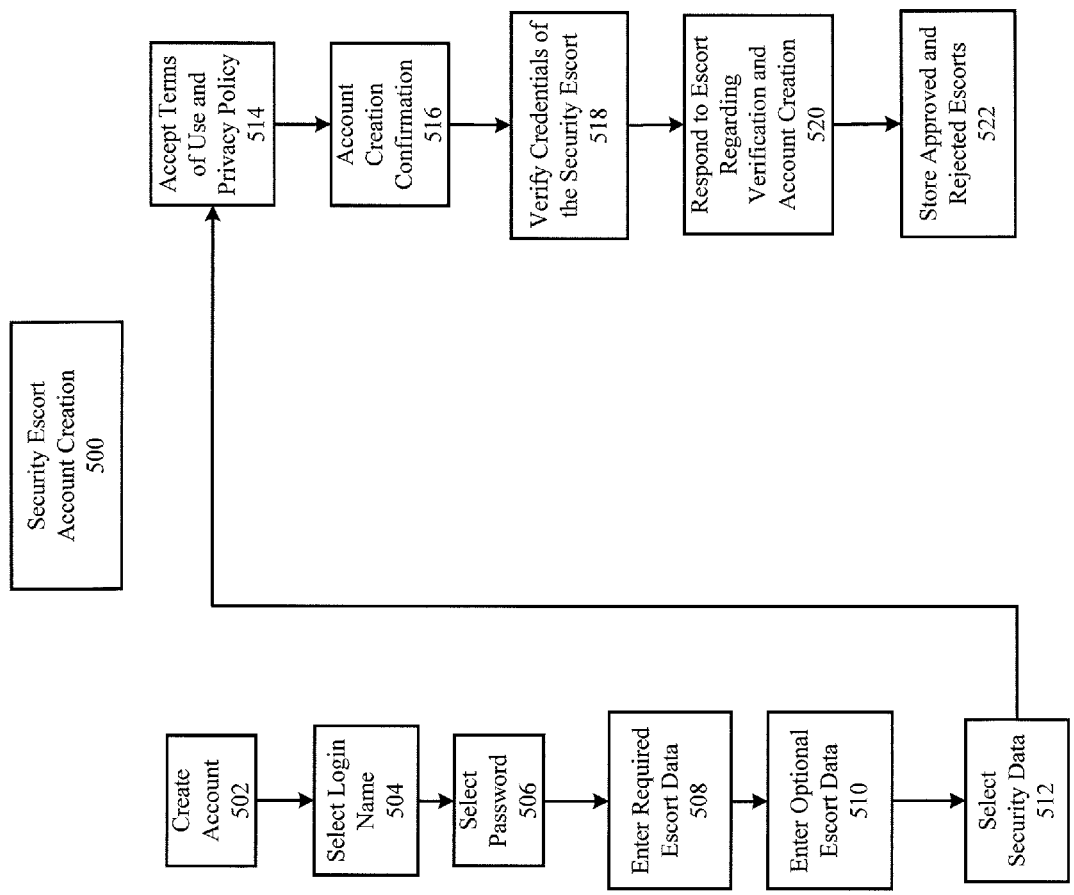
FIG. 5 is a process flow diagram illustrating one method for creating a security escort account.

FIG. 5 illustrates a method for security escort account creation 500 by which a security escort 112 may create an account 502 and gain access to the functions of the system 100. A security escort 112 may select the security escort account creation 500 process to initiate the account creation upon entering the security escort 112 interface on the security escort's mobile phone 114. An account can also be established at an internet page maintained as a part of the system. The security escort 112 may select login name 504 and may create an associated password 506. Additionally, the security escort 112 may provide the required security escort data 508 which preferably includes at least the first name, the last name, company, training 312, armed 314, uniformed 316, and mobile phone number in order to set up the account. The security escort 112 may add other optional escort data 510 to their account, such as a profile image, billing information, availability, and an email address. The security escort 112 may provide security data 512 in order to protect the security escort's 112 account and to verify that the security escort 112 is who they claim to be when they log into the system. The security escort 112 must accept the terms of use and the privacy policy 514 before receiving the account creation confirmation 516. The system 100 creates a tentative security escort 112 account until the screening facility verifies the credentials of the security escort 518. After account creation and credentials verification, the system 100 will respond to the security escort 112 regarding the verification and account creation 520. The system 100 will the store approved and rejected escorts 522 in the system database 216. After the security escort 112 receives a notification from the system 100, they may begin providing escort services to requesters 102.

Figure 6:
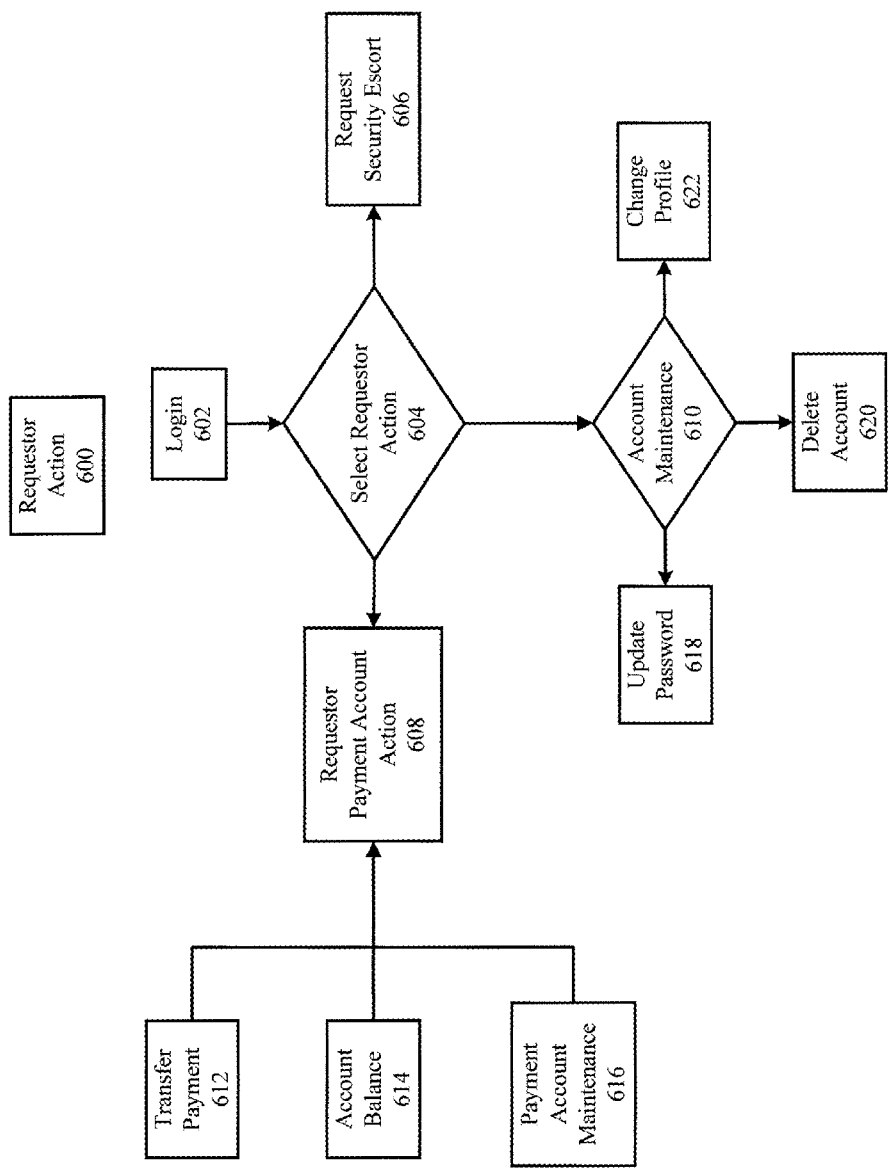
FIG. 6 is a process flow diagram illustrating one method for selecting a requester action.

FIG. 6 illustrates the functions for requester action 600 that are preferably available to a requester 102. The requester 102 enters a username and password in the login portal 602 via the requester's mobile phone 104, which verifies the requester's 102 credentials, and then the requester 102 selects the desired requester action 604 from one of the following typical actions: request security escort 606, requester payment account action 608, and account maintenance 610. The request security escort 606 is described below in FIG. 8. After the requester 102 selects requester payment account action 608, the requester 102 may then select transfer payment 612, check account balance 614, and payment account maintenance 616. The requester 102 may select transfer payment 612 to pay for the escort services provided from a credit card, a debit card, a PayPal® account, a bank account, and other methods of payment known to one skilled in the art. The requester 102 may perform payment account maintenance 616 by adding, deleting, and modifying the payment account as desired. Under account maintenance 610, the requester 102 may choose to undertake a range of functions including updating their password 618, deleting their account 620 and changing their profile 622.

Figure 7:
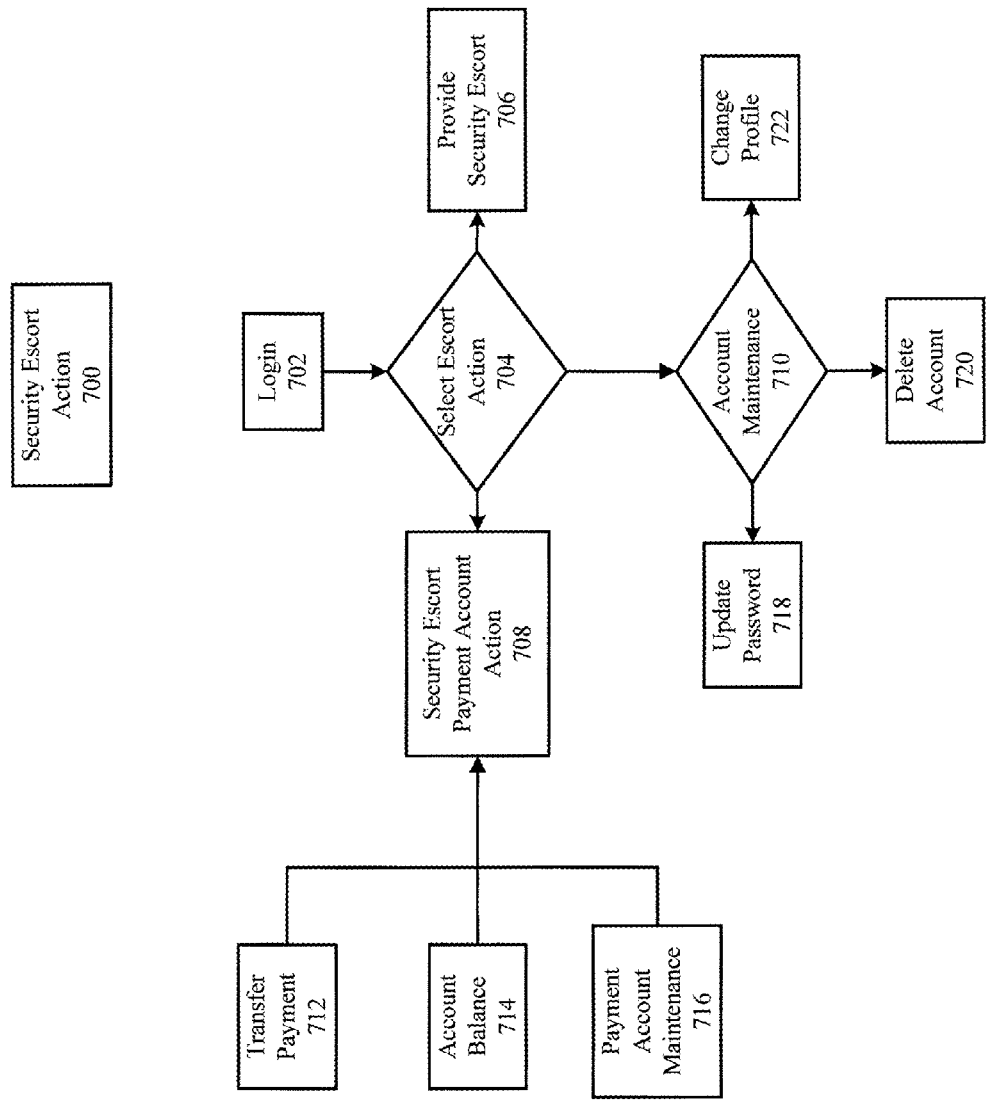
FIG. 7 is a process flow diagram illustrating one method for selecting a security escort action.

FIG. 7 illustrates the functions for security escort action 700 that are preferably available to a security escort 112. The security escort 112 enters a username and password in the login portal 702 via the security escort's 112 interface on the requester's mobile phone 114, which verifies the security escort's credentials 518, and then the security escort 112 selects the desired security escort function 704 from one of the following typical actions: provide security escort 706, security escort payment account action 708, and account maintenance 710. The provide security escort 706 function is described below in FIG. 8. After the security escort 112 selects security escort payment account action 708, the requester 102 may then select transfer payment 712, check account balance 714, and payment account maintenance 716. The security escort 102 may select transfer payment 712 to receive payment for the escort services provided. Additionally, the security escort 112 may under transfer payment 712 move funds to another account such as a personal account. The security escort 112 may perform payment account maintenance 716 by adding, deleting, and modifying the payment account as desired. Under account maintenance 710, the security escort 112 may choose to undertake a range of functions including updating their password 718, deleting their account 720 and changing their profile 722.

Figure 8:
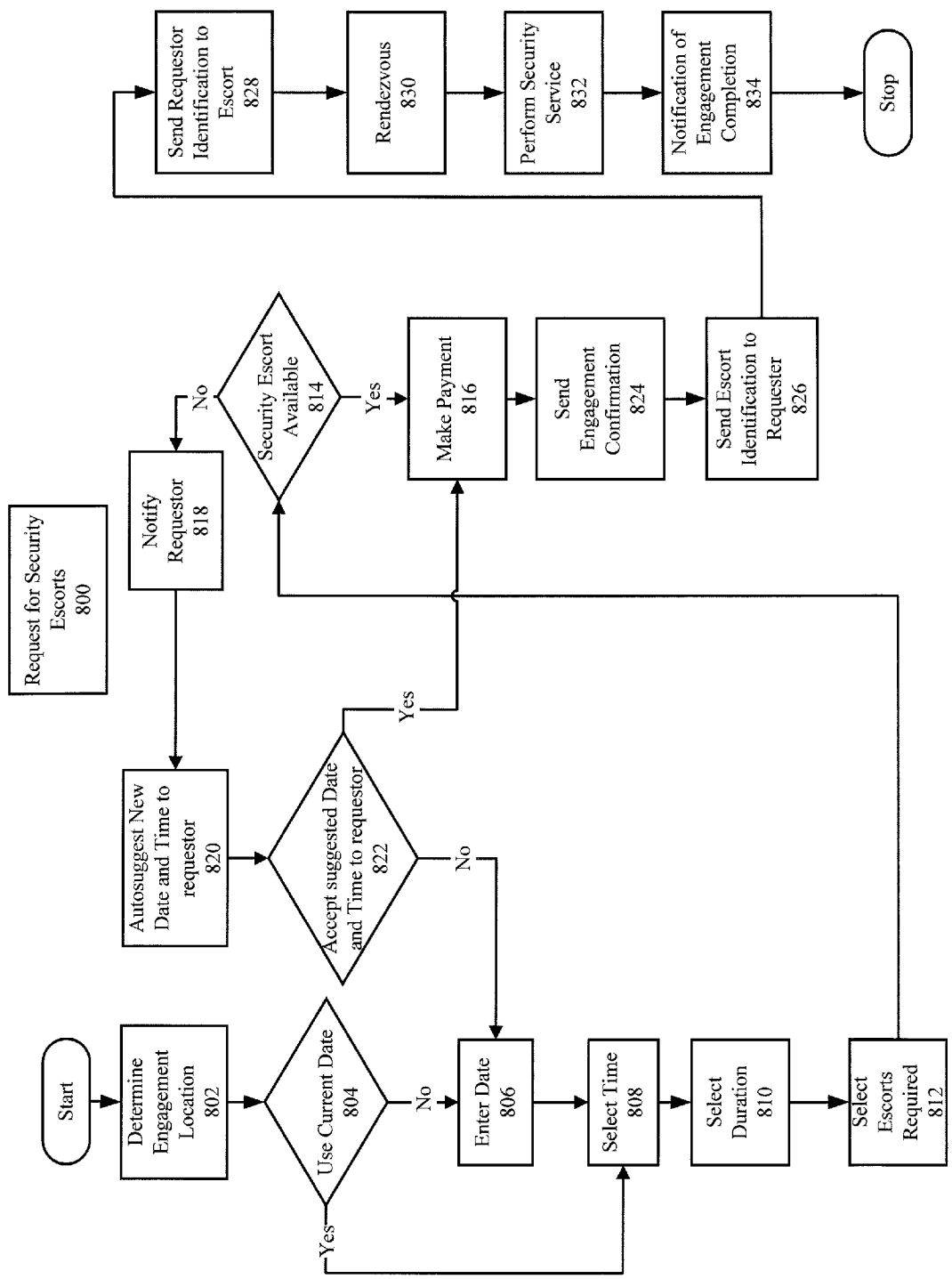
FIG. 8 is a process flow diagram illustrating one method for requesting security escorts.

FIG. 8 illustrates a method for requesting security escorts 800 by which a requester 102 may receive the services of a security escort 112. A request action may be selected from a saved request, a preprogrammed request, a third party request or a new engagement 318 request. When a new engagement 318 request is desired a requester 102 preferably starts the request for security escort process 800 through the requester's 102 mobile phone application on the requester's mobile phone 104. The requester's 102 first step may be to determine the engagement location 802. The selection of the engagement location is further described in FIG. 9. After the engagement location 802 is selected, the date 806 and time 808 of the engagement 318 may be selected. The requester 102 may select the current date 804 and then select a time 808. If the requester 102 chooses not to use the current date 804 but instead would like to select a future date, then the requester 102 may enter the date 806 and a time 808 in the succeeding step. After selecting the current date 804 and selecting the time 808, then the requester 102 may select the engagement duration 810. The duration 810 could be as small as a few minutes to escort a requester 102 to their car or as long as several hours to several consecutive days based on the need. For example, a realtor may request a security escort 112 for a multiple-day house showing. This need may arise from the house being at a remote location. The requester 102 may then select the number of escorts required 812 for the engagement 318. The number of escorts 812 may be determined by the duration 810 and type of engagement 318. Additional to the steps described above, the requester 102 may have the option of requesting whether the security escort 112 be armed 334, uniformed 336, a specific gender 338, and have specific training 332. After the date 806, time 808, duration 810, and number of escorts 812 is determined, the next step may be determining the security escort availability 814. The request submitted by the requester 102 is matched to the available escorts 112 based on the request factors 308 and engagement data 304. If no escorts 112 are available considering the request factors 308 and engagement data 304 for the time requested, the system's 100 next step may be to notify the requester 818 of the lack of security escorts 112 for the requested engagement 318. The system 100 may autosuggest a new date and time 820 to the requester 102 to determine their flexibility within the engagement data 304 and request factors 308. If the requester 102 accepts the autosuggestion for the date and time 822 then the requester 102 is then allowed to make a payment 816. A payment may be made by the following: scanning a payment card such as a debit or credit card, by an electronic funds transfer such as PayPal®, and a prepaid account. One skilled in the art may choose other methods for payment known to them.

If the requester 102 does not accept the suggested time and date 822 then the requester 102 may be sent back several steps to begin the process again. These steps in the process may continue until a set of agreeable engagement data 304 and request factors 308 are determine to satisfy the requester 102. After the make payment step 816, the system 100 may send an engagement confirmation 824 to the requester 102, the escort identification information 826 to the requester 102 and the requester identification 828 to the escort 112, which may allow them to rendezvous 830 for the engagement 318 wherein the security escort 112 will perform the security service 832 requested for the duration 810 selected. After completion of the engagement 318, the escort 112 may send notification of the engagement completion 834 to the system 100 to allow the system 100 to make the escort 112 available for a new engagement 318. A requester 102 may make multiple requests for themselves so long as the requests are differentiated by timing and do not overlap. A requester 102 may save a request or pre-program a specific type of engagement 318 for future use. Additionally, a third party may make requests for security services on another's behalf. Also, a third party may receive notification of when an engagement 318 has begun and been terminated if so desired.

Figure 9:
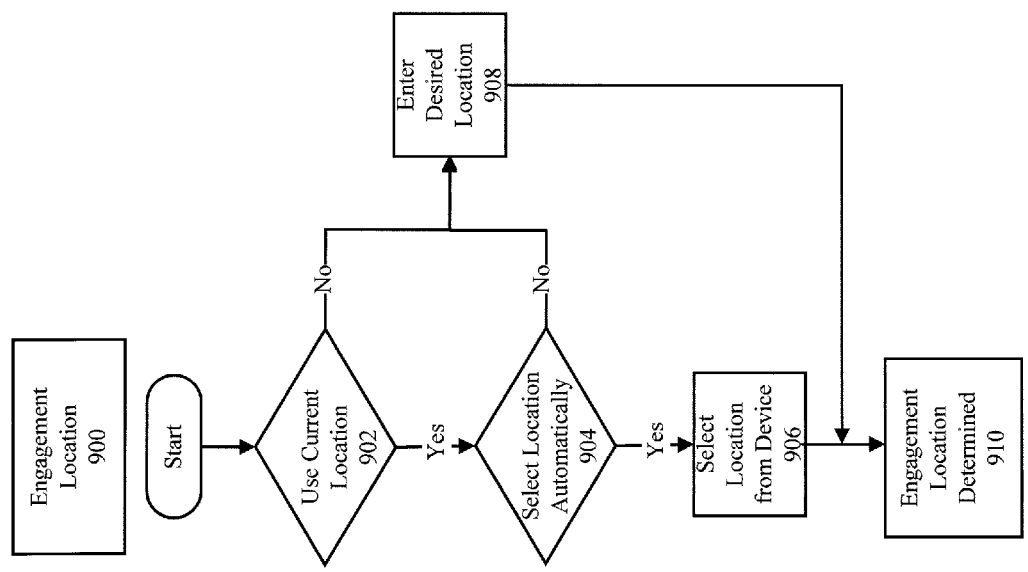
FIG. 9 is a process flow diagram illustrating one method for selecting engagement location.

FIG. 9 illustrates a method for determining the engagement location 900 by which a requester 102 may submit a request to the system 100. The requester 102 may use the requester's mobile phone 104 and select the current location 902 if the current location is the desired location 320 for the engagement 318. The requester 102 may choose to select a location automatically 904 by using a stored location or selecting the device's location 906, which may be determined through GPS, triangulation, and other self-contained location determination methods as described above. If neither inputting the current location 902 nor selecting the current location automatically 904 is chosen, then the requester 102 may then enter a desired location 908 for the location of the future engagement 318. Selection of a future location can be accomplished by entry of an address, by search for a business or other location, or by selection of a location on a map displayed to the user. Once the engagement location determination 910 is complete, this information may be submitted to the request for security escorts 800 process at the determine engagement location step 802, FIG. 8, which may allow the request for security escorts 112 to proceed.

Figure 10:
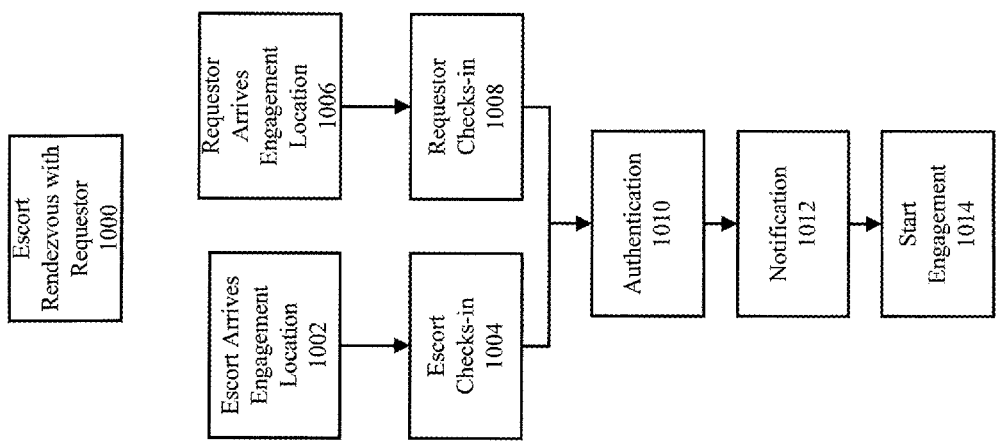
FIG. 10 is a process flow diagram illustrating one method for requester to rendezvous with the security escort.

FIG. 10 illustrates a method for an escort rendezvous with requester 1000 to initiate the engagement 318. After the engagement data 304 is selected, payment 816 has been made, and requester 102 and escort identification information, 826, 828, respectively have been exchanged, then the escort will rendezvous 830 with the requester 102. The initial step of the escort rendezvous process 1000 may begin with the security escort 112 arriving at the engagement location 1002 wherein the successive step may be for the escort to check-in 1004 with the system 100 using the security escort mobile phone 114. The requester 102 follows a similar set of steps such as arriving at the engagement location 1006 and checking in 1008 with the system 100 using the requester mobile phone 104. These steps may be completed serially or in parallel. Once both the security escort 112 and the requester 102 have both arrived and checked in, preferably the next step may be the authentication of the identity of both the requester 102 and the security escort 112 to each other for their safety and security. The authentication 1010 may be conducted through the use of photographs that were sent previously and other methods of identification including: identification card, symbol, code words, and biometric means. Other methods to authenticate known by one skilled in the art may be used. Once authentication 1010 has been made then notification 1012 to the system 100 preferably be made to allow the system to make the security escort 112 unavailable during the requested engagement 318. During the notification, a requester 102 may enter a distress code to notify the control center 202 of an emergency without alerting anyone within close proximity to the requester 102 that she has provided notification of an emergency. After the notification 1012 is made, then the escort 112 and the requester 102 may proceed to a final step in the escort rendezvous process 1000 to begin the engagement 1014 wherein the request for security escorts 800 process step rendezvous 830 FIG. 8 may be complete and the process may continue to the perform security service 832 step.

Figure 11:
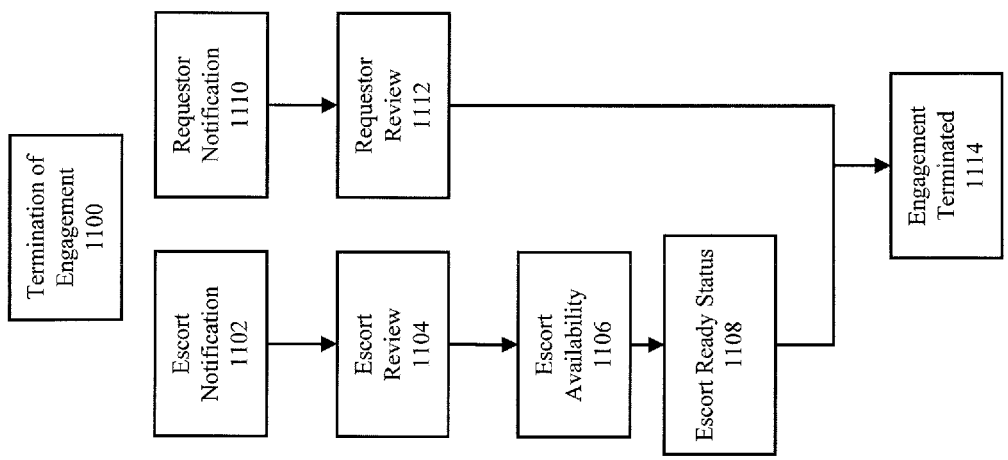
FIG. 11 is a process flow diagram illustrating one method to terminate an engagement.

FIG. 11 illustrates a method for termination of the engagement 1100 process by which a requester 102 and a security escort 112 may terminate a completed engagement 318. Before the engagement 318 is considered terminated, the security escort 112 may execute the following steps. The security escort 112 may provide escort notification 1102 to the system 100, provide an escort review 1104 of the engagement 318 and of the requester 102 by the security escort mobile phone 114 whereupon providing this information, the escort 112 may be deemed available 1106 for future engagements 318. The system 100 upon receiving notification from the security escort 112 and the requester 102 of the termination of the engagement 318 will change the escort ready status 1108 to ready for future engagements and thereby allowing the engagement 318 to be terminated 1114. Concurrently, the requester 102 may provide a requester notification 1110 to the system 100 and may provide a requester review 1112 of the security escort 112 and the service provided to the system 100 by requester mobile phone 104 before the engagement 318 may be considered complete.

Having thus described the invention, I claim:
1. A mobile phone-based system for providing on-demand security to a requester primarily via non-voice communication, the system comprising:
  a. a database having
    i. requester data,
    ii. security escort data,
    iii. engagement data,
    iv. review data, and
    v. at least one request factor;
  b. at least one requester mobile phone having
    i. at least one non-voice communication channel,
    ii. at least one voice communication channel,
    iii. an interface adapted to—
      A. request security escorts for at least one time period in at least one location,
      B. select at least one request factor and send a request to an engagement engine,
      C. receive a response from the engagement engine,
      D. enable the requester to meet and identify an escort,
      E. declare an emergency,
      F. terminate security escort for one time period in one location, and
      G. close an engagement;
  c. a screening facility adapted to—
    i. qualify at least one selected from security escort, requester, and
    ii. review qualifications of at least are selected from escort and requestor;
  d. at least one security escort mobile phone having—
    i. at least one non-voice communication channel,
    ii. at least one voice communication channel,
    iii. an interface adapted to—
      A. receive a proposed security engagement,
      B. respond to the proposed engagement,
      C. receive security escort details,
      D. enable an escort to meet and identify a requester,
      E. declare an emergency, and
      F. close an engagement;
  e. an engagement engine having—
    i. a query generator interactively facilitating each request and generating a query most closely related to the requester's needs in view of each applicable request factor, and
    ii. a response generator receiving the query and applying request factors to generate a response including confirmation of request, expected cost, and escort identification;
  f. a meeting engine adapted to—
    i. transmit location and identification data to the requester and escort,
    ii. facilitate a meeting between the requester and the escort,
    iii. receive verification of an agreeable meeting,
    iv. close each engagement upon notification from at least one selected from requester and escort database, and
    v. pay the escorts
  whereby the security escorts required for a particular engagement are determined based on requester-provided data as a function of a requester requirements, security escort provider abilities, and application of request factors.

2. The system of claim 1, where the database includes a set of security escort data for at least one security escort for at least one engagement.

3. The system of claim 1, where the database records include categories of engagements based on factors including at least one of: engagement, location, duration, date, time, number of escorts, escort training, armed, uniformed, gender, and transportation.

4. The system of claim 1, where at least one request action is selected from a group including: saved, preprogrammed, third party, and new.

5. The system of claim 1, where system specific software is installed on the requester phone wirelessly.

6. The system of claim 1, where requester may make multiple requests differentiated by timing.

7. The system of claim 1, where third party requester may make a request for a first party to receive a security escort.

8. The system of claim 1, where third party requester may make multiple requests for plurality of first parties.

9. The system of claim 1, where third party requester receives notification of engagement termination.

10. The system of claim 1, where a requester photograph is stored with requester profile.

11. The system of claim 1, where a requester photograph is uploaded with the current view of the requester.

12. The system of claim 1, where a requester may connect directly to the security escort by voice.

13. The system of claim 1, where a requester may declare an emergency.

14. The system of claim 13, where a requester may declare an emergency by entering a distress code.

15. The system of claim 14, where a requester is automatically connected to governmental first responders.

16. The system of claim 14, where a requester is automatically connected to a system control center.

17. The system of claim 1, wherein payment data is entered by a requester selected from scanning a payment card, electronic funds transfer, and a prepaid account.

18. The system of claim 1, where a screening facility may remove non-qualified escorts from service.

19. The system of claim 1, where a screening facility may block at least one requester.

20. The system of claim 1, where a screening facility may remove at least one requester from the database.

21. The system of claim 1, where a screening facility may block at least one security escort.

22. The system of claim 1, where a screening facility may remove at least one security escort from the database.

23. The system of claim 1, where a requester's phone number is hidden from the security escort.

24. The system of claim 1, where a security escort's phone number is hidden from the requester.

25. The system of claim 1, where a security escort photograph is stored with security escort profile for identification at engagement.

26. The system of claim 1, where a security escort photograph is uploaded with the current view of the escort for quicker recognition and improved security.

27. The system of claim 1, where a security escort may connect directly to the requester by voice.

28. The system of claim 1, where a security escort may declare an emergency.

29. The system of claim 28, where a security escort may declare an emergency by entering a distress code.

30. The system of claim 28, where a security escort is automatically connected to government first responders.

31. The system of claim 28, where a security escort is automatically connected to a control center.

32. The system of claim 1, where the location data is determined by an automated positioning capability.

33. The system of claim 32, where the automated positioning capability is selected from at least one of: multilateration, triangulation, global positioning system, and WIFI.

34. The system of claim 1, wherein the security escort is selected based on factors including at least one of: number of escorts, training, armed, uniformed, gender, and transportation.

35. The system of claim 1, wherein the expected cost is calculated based on factors including at least one of: number of escorts, training, armed, uniformed, gender, transportation, location, duration, and immediacy.

36. The system of claim 1, wherein the security escort is selected based on factors including at least one of: expected cost, availability, engagement factors, request factors, and reviews.

37. The system of claim 1, wherein the requester provides a post engagement review of an escort.

38. The system of claim 1, wherein the security escort provides a post engagement review of a requester.

39. A mobile phone-based method for providing security escorts to a requester for a location, time, and duration by a security escort provider, the method comprising:
  a. receiving request data from at least one requester's mobile phone for at least one engagement in at least one location;
  b. creating a record in a database for each requester request;
  c. collecting request factor data relevant to at least one engagement in at least one location;
  d. creating at least one record in the database for request factor data;
  e. requesting availability from at least one security escort for at least one engagement in at least one location based request factor data;
  f. calculating cost information for the engagement based on data from
  g. providing requester with confirmation of escort availability for engagement and other factors;
  h. request factors;
  i. receiving payment from requester for at least one engagement in at least one location;
  j. transmitting authentication and confirmation information to mobile phone of the requester and the security escort;
  k. rendezvousing requester at the location with the security escort;
  l. exchanging authentications to verify the identity of requester and escort;
  m. providing the security service as requested by the requester in at least one location;
  n. completing the security escort's engagement;
  o. notifying the security escort's provider of the engagement termination making security escort available for new engagement;
  p. paying security escort for at least one engagement in at least one location based on request factors;
  q. creating at least one record in the database for review data;
  whereby a requester can request tailored security escorts for an engagement in a location, date, and time based on request factors wherein the cost is determined by the applicable adjustment factors.

40. The system of claim 39, where requester may make multiple requests differentiated by timing.

41. The system of claim 39, where third party requester may make a request for a first party to receive security.

42. The system of claim 39, where third party requester may make multiple requests for plurality of first parties.

43. The method of claim 39, where at least one request action is selected from a group including: completed, third party, saved, preprogrammed, and new engagements.

44. The method of claim 43, where a requester may program requests in the mobile phone for future submission.

45. The method of claim 43, where a requester may save completed engagements on the mobile phone for use in the future.

46. The method of claim 43, where a requester may view and reuse parameters from completed engagements.

47. The method of claim 39, where the database is pre-loaded with at least one security escort data for at least one security escort for at least one engagement category.

48. The method of claim 39, where the database records include categories of engagements based on engagement data and request factors.

49. The method of claim 39, where the database is loaded with at least one expected cost for at least one engagement with at least one request factors.

50. The method of claim 39, where the database is loaded with at least one expected cost range for at least one engagement category with at least one request factor.

51. The method of claim 39, where a requester photograph is stored with requester record for identification at engagement.

52. The method of claim 39, wherein the security escort is selected based on factors including at least one: expected cost, availability, engagement factors, request factors, and reviews.

53. The method of claim 39, wherein the requester may check at least one review of at least one escort available.

54. The method of claim 39, wherein the escort may check at least one review of the requester.

55. The method of claim 39, wherein the expected cost is calculated based on factors including at least one of: number of escorts, training, armed, uniformed, gender, transportation, location, duration, and immediacy.

56. The method of claim 39, where the authentication data is selected from at least one of: picture, code, symbol, and identification card.

57. The method of claim 39, where authentication fails, the requester or security escort may notify the control center facility of an emergency.

58. The method of claim 39, where the rendezvous location data is determined by an automated positioning capability.

59. The method of claim 58, where the automated positioning capability is selected from at least one of: multilateration, triangulation, global positioning system, and WIFI.

60. The method of claim 39, wherein the requester provides a review of the escort service provided.

61. The method of claim 39, wherein the security escort provides a review of the requester interaction.

62. The method of claim 39, wherein payment data is entered by a requester selected from scanning a payment card, electronic funds transfer, currency, and a prepaid account.

63. The method of claim 39, wherein engagement payment information data includes at least one of the following: cost, duration, time, date, location, number of escorts, training, armed, uniformed and transport.

64. A mobile phone-based system for providing on-demand security services to a requester primarily via non-voice communication, the system comprising:
   a. a database having—
      i. requester data,
      ii. security escort data,
      iii. categorized engagement data,
      iv. review data, and
      v. at least one request factor;
   b. at least one requester mobile phone having—
      i. at least one non-voice communication channel,
      ii. automated location determination,
      iii. an interface adapted to—
         A. select at least one request action,
         B. request security escorts for at least one time period in at least one location,
         C. select at least one request factor and sending a request to the engagement engine,
         D. receive a response from the engagement engine,
         E. enable requester to upload photograph
         F. enable the requester to meet and identify an escort,
         G. enable a requester to connect directly to the security escort,
         H. declaring an emergency, and
         I. terminate security escorts for one time period in one location, and
         J. close an engagement;
   c. a screening facility adapted to—
      i. qualify at least one selected from security escort, requester,
      ii. review at least one screened person's security escort's qualifications, and
      iii. block at least one screened person;
      iv. remove at least one screened person from the database;
   d. at least one security escort mobile phone having—
      i. at least one non-voice communication channel,
      ii. automated location determination,
      iii. an interface adapted to—
         A. receive a proposed security engagement,
         B. respond to the proposed engagement,
         C. receive security escort details,
         D. enable security escort to upload photograph
         E. enable an escort to meet and identify a requester,
         F. enable a security escort to connect directly to the requester,
         G. declare an emergency,
         H. terminate security escorts for one time period in one location,
         I. close an engagement;
   e. an engagement engine having—
      i. a query generator interactively facilitating each requester request and generating a query most closely related to the requester's needs in view of each applicable request factor, and
      ii. a response generator receiving the query and applying request factors to the query to generate a response including confirmation of request, expected cost, and escort identification;
   f. a meeting engine adapted to—
      i. transmit location and identification data to the requester and escort,
      ii. facilitate a meeting between the requester and the escort,
      iii. receive verification of an agreeable meeting,
      iv. close each engagement upon notification from at least one selected from requester and escort database, and
      v. pay escorts by electronic funds transfer
   whereby the security escorts required for a particular engagement are determined based on requester-provided data as a function of a requester requirements, security escort provider abilities, and application of applicable request factors.

* * * * *